United States Patent [19]

Kuwabara et al.

[11] Patent Number: 5,023,526
[45] Date of Patent: Jun. 11, 1991

[54] VIBRATORY MOTOR

[75] Inventors: Yasuo Kuwabara; Naofumi Fujie, both of Nagoya, Japan; Takao Saeki, Farmington Hills, Mich.

[73] Assignee: Aisin Seiki Kabushiki Kaisha, Kariya, Japan

[21] Appl. No.: 422,907

[22] Filed: Oct. 17, 1989

[30] Foreign Application Priority Data

Oct. 31, 1988 [JP] Japan .............................. 63-276587
Jan. 25, 1989 [JP] Japan .................................. 1-15499

[51] Int. Cl.$^5$ ............................................. H01L 41/08
[52] U.S. Cl. ................................. 318/116; 310/316; 310/323
[58] Field of Search ............... 310/316, 317, 323, 328; 318/116, 118

[56] References Cited

U.S. PATENT DOCUMENTS

| | | | |
|---|---|---|---|
| 3,668,486 | 6/1972 | Silver | 310/316 X |
| 3,989,042 | 11/1976 | Mitsui et al. | 310/316 X |
| 4,113,809 | 9/1978 | Abair et al. | 310/316 X |
| 4,184,092 | 1/1980 | Wieser | 310/316 |
| 4,371,816 | 2/1983 | Wieser | 310/316 X |
| 4,607,652 | 8/1986 | Yung | 310/316 X |
| 4,692,649 | 9/1987 | Izukawa et al. | 310/316 |
| 4,727,276 | 2/1988 | Izukawa et al. | 310/316 |
| 4,743,788 | 5/1988 | Takagi et al. | 310/316 |
| 4,794,294 | 12/1988 | Shimizu et al. | 310/316 |
| 4,914,337 | 4/1990 | Takagi | 310/316 |

*Primary Examiner*—Mark O. Budd
*Attorney, Agent, or Firm*—Burns, Doane, Swecker & Mathis

[57] ABSTRACT

A vibratory motor is provided with a detecting member for detecting rotational speed of a rotor member and a control circuit for stopping oscillation of a stator member of the motor when the rotational speed of the rotor member becomes less than a predetermined speed. When the rotational speed of the rotor member is less than the predetermined speed, the control circuit stops oscillation of the stator member. When the stator member stops oscillating, slippage is not generated between the rotor member and the stator member and deterioration of the motor due to friction is successfully decreased.

5 Claims, 4 Drawing Sheets

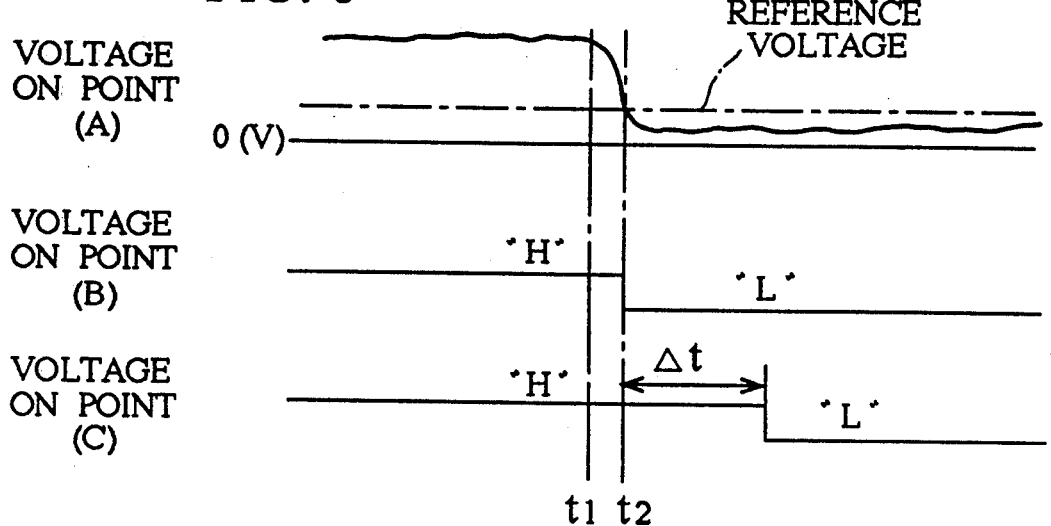
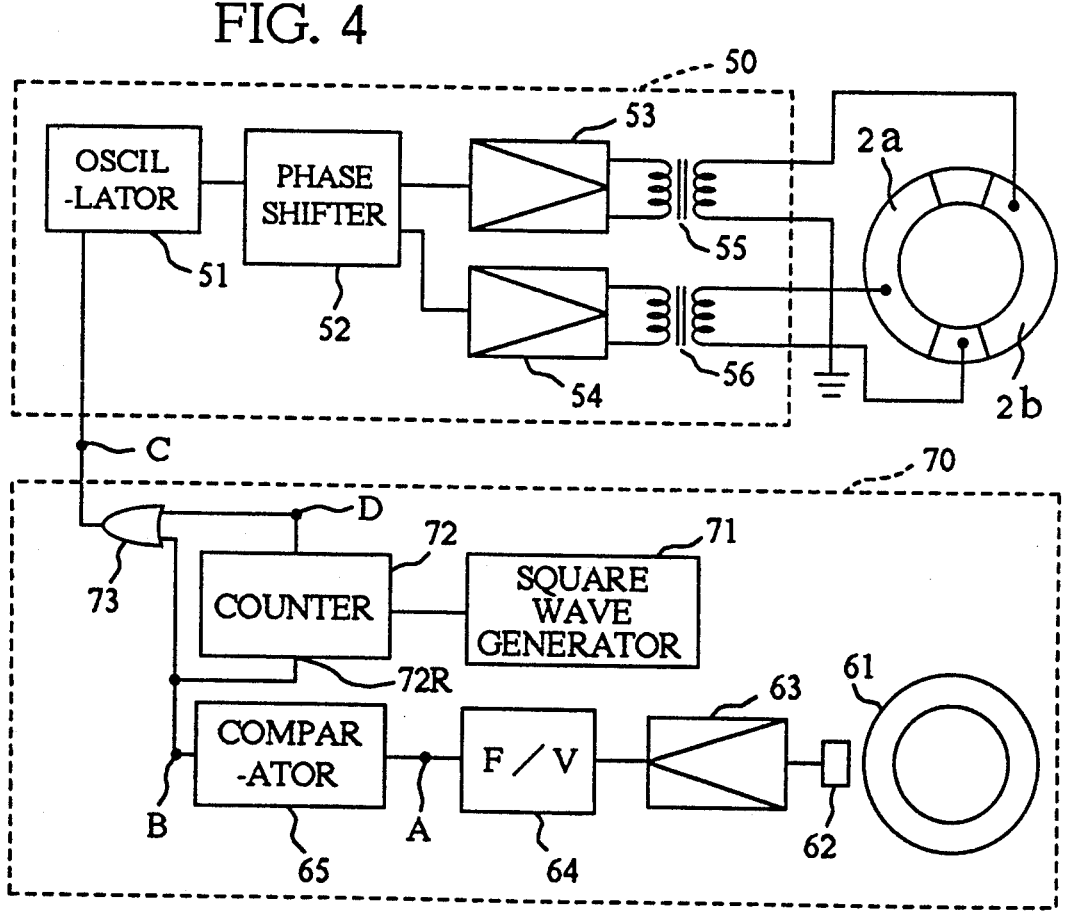

VIBRATORY MOTOR

BACKGROUND OF THE INVENTION

This invention relates to a motor which utilizes vibrations on a stator member as a driving source.

Conventionally, a motor which utilizes vibrations on a stator member is well known in the art. The motor rotates a rotor member due to transmitted vibrational energy from the stator member to the rotor member by frictional force. Accordingly, rotational speed of the rotor may be decreased due to an increased slippage between the stator member and the rotor member as a load connected to the rotor, is increased, i.e., as the load on the motor, is increased.

Thus, the conventional vibratory motor deteriorates in efficiency due to the slippage between the stator member and the rotor member if an excessive load is connected to the rotor member.

SUMMARY OF THE INVENTION

One of the objects of this invention is to obviate the above drawbacks of the conventional motors.

It is also an object of this invention to provide a system to restart a rotor member after dissipating an excessive load.

To achieve the above objects, and in accordance with the principles of the invention as embodied and broadly described herein, the vibratory motor, includes an arrangement for detecting rotational speed of a rotor member, and for stopping oscillation of a stator member if the rotational speed becomes less than a predetermined speed.

Preferably, the vibratory motor includes a control arrangement for restarting oscillation of the stator member after elapse of a predetermined period of time.

BRIEF DESCRIPTION OF THE DRAWINGS

The accompanying drawings, which are incorporated in and constitute a part of the specification, illustrate an embodiment of the invention and serve to explain the principles of the invention. In the drawings:

FIG. 3 is a wave form chart showing various wave forms taken at on selected points in FIG. 2.

FIG. 4 is a block diagram of the oscillator circuit and control circuit in accordance with a second embodiment of this invention.

DETAILED DESCRIPTION OF THE PREFERRED EMBODIMENTS

Figure 1:
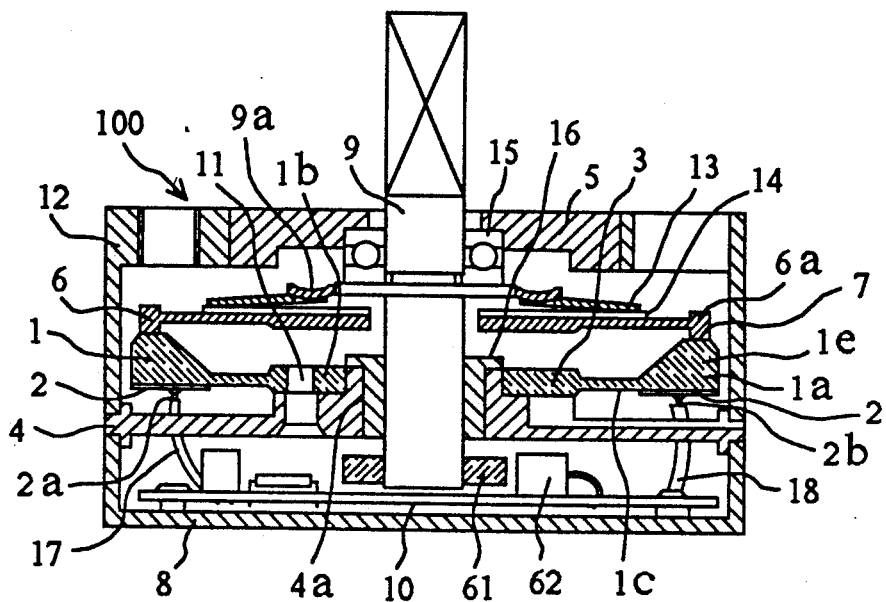
FIG. 1 is a cross-sectional view of a supersonic motor in accordance with a first embodiment of this invention.

Reference will now be made in detail to the present preferred embodiment of the invention, an example of which is illustrated in the accompanying drawings. In accordance with the invention, a stator member is defined by a stator 3, a vibrating member is defined by a vibrator 2, a rotor member is defined by rotor 6, an oscillator is defined by the oscillation circuit 50. A detector arrangement is defined by a ring magnet 61 and a Hall-effect element 62, and a control system is defined by control circuits 60, 70 and 80.

Referring now to FIG. 1, a vibratory motor 100 of the first embodiment will be explained. A central opening 4a is provided at the center of a disc shaped base 4. A bearing 16 is press fit into the central opening 4a.

An inner portion of a disc shaped stator 3 is supported by the base 4. The stator 3 is fixed to the base 4 by screw or fastening member 11. The stator 3 comprises a ring-shaped elastic member 1 and a ring-shaped piezoelectric vibrator 2. The piezoelectric vibrator 2 is adhered to the elastic member 1 by use of a conductive adhesive.

The elastic member 1 includes an outer ring portion 1a, an inner ring portion 1b, and a thin portion 1c. The outer portion 1a and the inner portion 1b are connected integrally with the thin portion 1c. The elastic member 1 is fixed to the base 4 by supporting the inner portion 1b with the screw or fastening member 11. The projections 1e are provided on the outer portion 1a. Each projection 1e has a constant gap therebetween. The elastic member 1 is made of a conductor, i.e., phosphor-bronze. Thus the elastic member 1 is electrically connected to the base 4.

The piezoelectric vibrator 2 generates a travelling wave on the stator 3. A piezoelectric vibrator 2 for generating such a traveling wave is well known in the art. Therefore, the detailed explanation for the piezoelectric vibrator 2 is herein omitted. The piezoelectric vibrator 2 has a pair of elements 2a and 2b. Further, a pair of conductive wires 17 and 18 are connected to the piezoelectric vibrator 2. The element 2a is contracted and expanded when a source supplies A.C. power between the conductive wire 17 and the base 4. The element 2b is contracted and expanded when a source supplies A.C. power between the conductive wire 18 and the base 4. When the elements 2a and 2b are contracted and expanded due to proper A.C. power, travelling waves are generated on the elastic member 1.

A cylindrical member 12 is threadly engaged and fixed to the base 4. A cover member 5 is threadly engaged with the cylindrical member 12 so as to define a screw connection between the cover member 5 and the cylindrical member 12. Accordingly, the cover member 5 moves in the axial direction of the shaft 9 when the cover member 5 is rotated. The base member 4, the cylindrical member 12 and the cover member 5 constitute a housing for the vibratory motor 100.

A bearing member 15 is fixed to the cover member 5 so that the shaft 9 is rotatably mounted in the bearings 15 and 16. The bearing 15 is in contact with a flange portion 9a of the shaft 9. The flange portion 9a prevents movement of the shaft 9 toward the cover member 5.

The rotor 6, a rubber seat 14 and a cone spring 13 are positioned between the bearing 15 and the elastic member 1. The rotor 6 and the rubber seat 14 are pressed toward the stator 3 by the spring force of the cone spring 13. The rubber seat 14 prevents aural noises from being generated between the rotor 6 and the cone spring 13 due to oscillation of the rotor 6.

The cone spring 13 is in contact with and positioned by the flange portion 9a of the shaft 9, thus the cone spring 13 is supported by the flange portion 9a coaxially with the bearing 15. Further, the pressure between the stator 3 and the rotor 6 can be adjusted by rotating the cover member 5 as the cover member 5 is movable along the axial direction of the shaft 9.

A sliding portion 6a is formed at an outer extent of the rotor 6. One surface of the sliding portion 6a faces toward the outer portion 1a of the elastic member 1. A friction film 7 is pinched or held between the sliding portion 6a and the outer portion 1a. As the rotor 6 is pressed toward the stator 3, the sliding portion 6a is pressed against the projections 1e formed on the outer portion 1a through the friction film 7.

The travelling waves are generated on the elastic member 1 due to the oscillation of the piezoelectric vibrator 2 when the A.C. power is supplied to the conductive wires 17, 18 and the base 4. The travelling waves go around the outer portion 1a of the elastic member 1. During this time, the amplitude of the travelling wave is amplified by the projections 1e. Thus, the travelling wave feeds a moment of rotation to the rotor 6. Accordingly, the rotor 6 rotates with the shaft 9 when the traveling wave is generated on the elastic member 1.

A ring magnet 61 is fixed to one end of the shaft 9. The magnet 61 rotates together with the shaft 9. The ring magnet 61 provides a predetermined number, i.e., 20, magnetic poles around circumference thereof. A Hall-effect element 62 is provided close to the ring magnet 61. The Hall-effect element 62 is fixed to a circuit board 10. The circuit board 10 includes an oscillating circuit 50 and a control circuit 60. The circuit board 10 is fixedly attached to a lower cover 8. The lower cover 8 is fixedly attached to the base 4.

Figure 2:
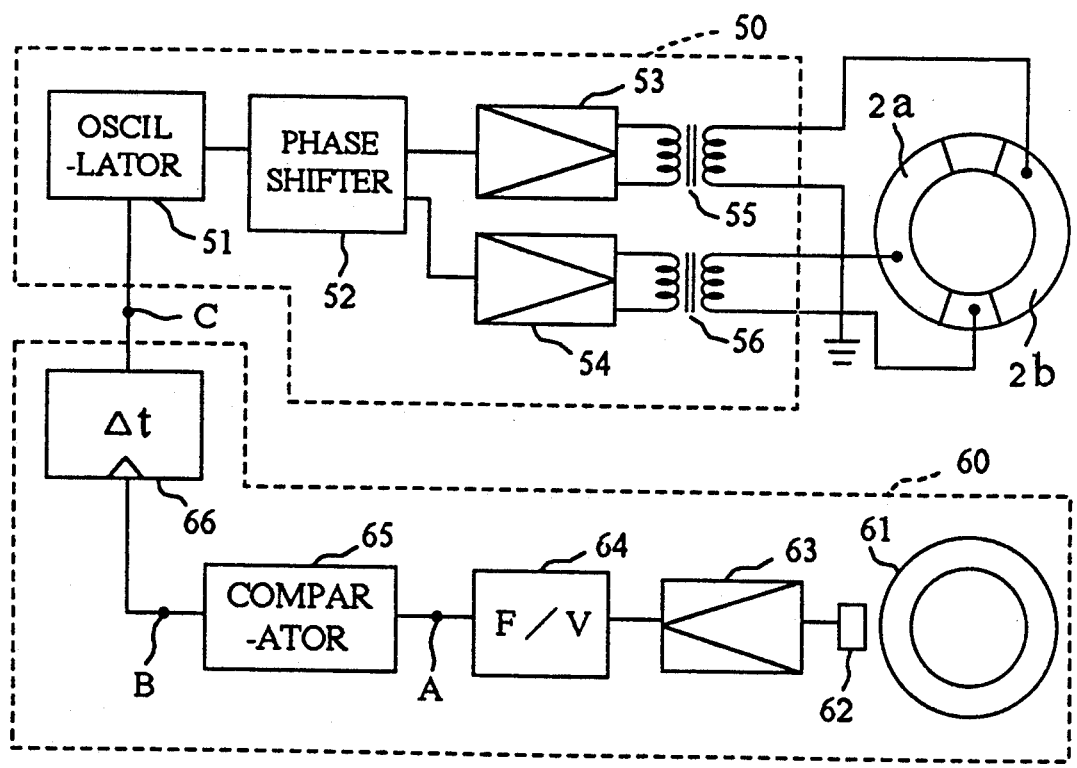
FIG. 2 is a block diagram of the oscillator circuit and control circuit in accordance with a first embodiment of this invention.

Referring now to FIG. 2, the oscillation circuit 50 and the control circuit 60 will be explained.

The oscillation circuit 50 includes an oscillator 51, phase shifter 52, drivers 53 and 54, and transformers 55 and 56. An oscillation signal, generated by the oscillator 51 is supplied to the phase shifter 52. The phase shifter 52 generates two separate signals based on the supplied oscillation signal. The two separate signals have a mutual difference of phase corresponding to 90 degrees. The two separate signals are applied to the elements 2a and 2b through the drivers 53, 54 and transformers 55, 56. The piezoelectric vibrator 2 generates the traveling wave on the stator 3 in order to rotate the rotor 6 when the two separate signals are applied to the elements 2a and 2b.

The control circuit 60 includes the ring magnet 61, the Hall-effect element 62, an amplifier 63, an F/V converter 64, a comparator 65 and delay 66. The rotational speed of the rotor 6 is converted into an A.C. signal by the ring magnet 61 and the Hall-effect element 62.

The A.C. signal from the Hall-effect element 62 has a frequency corresponding to the rotational speed of the rotor 6. The A.C. signal is amplified by the amplifier 63. Then, the A.C. signal is converted into a D.C. signal by the F/V converter 64. The D.C. signal from the F/V converter 64 has a voltage level which corresponds to the rotational speed of the rotor 6.

The D.C. signal from the F/V converter 64 is supplied to the comparator 65. The comparator 65 has a predetermined reference voltage. The reference voltage is based on a rotational speed detected just before stoppage of the rotor 6. The comparator 65 generates an "H" or high level signal when the D.C. signal from the F/V converter 64 exceeds the reference voltage. The comparator generates an "L" or low level signal when the D.C. signal from the F/V converter 64 is less than the reference voltage. The output signal from the comparator 65 is transmitted to the oscillator 51 through the delay 66. The oscillator 51 oscillates and vibrates the stator 3 as long as the "H" level signal is supplied from the delay 66.

Referring now to FIG. 3, operation of the first embodiment is explained.

At the time $t_1$, the rotational speed of the rotor 6 is decreased due to an excessive load connected to the shaft 9. When the rotational speed of the rotor 6 is decreased, a voltage at a point A in FIG. 2 is decreased. At the time $t_2$, when the voltage at point A becomes less than the reference voltage, voltage at point B is changed from the "H" level to the "L" level. Thus, the stoppage of the rotor 6 is detected. At this time, a large amount of slippage is generated between the rotor 6 and the stator 3. As a result of the slippage, deterioration of the rotor 6, the stator 3 and the friction film 7 increases.

After elapse of a predetermined period of time $\Delta t$ from detecting stoppage of the rotor 6, voltage at a point C is changed from the "H" level to the "L" level. At the time, the oscillator 51 stops oscillating.

Thus, when the rotational speed of the rotor 6 is less than the predetermined speed, the control circuit 60 stops the oscillation of the oscillation circuit 50. While the oscillation circuit 50 stops oscillating, slippage is no longer generated between the rotor 6 and the stator 3. Therefore, the deterioration of the rotor 6, the stator 3 and the friction film 7, due to the slippage, is successfully decreased.

In the first embodiment, the oscillation circuit 50 oscillates continuously during the period of time $\Delta t$ after detecting the stoppage of the rotor 6. Therefore, the vibratory motor 100 of the first embodiment avoids sudden stoppage of the rotor 6 due to excessive loads applied to the output shaft.

Next, referring to FIG. 4, the second embodiment of the invention will be explained. The second embodiment has the same construction as the first embodiment except for the control circuit 70. Therefore, only the control circuit 70 is explained hereinafter.

The control circuit 70 includes a square-wave generator 71, a counter 72 and an OR gate 73 instead of the delay 66 in FIG. 2. Other construction of the circuit is the same as the first embodiment in FIG. 2.

The output signal of the comparator 65 is supplied to the oscillator 51 through the OR gate 73. The output signal of the comparator 65 is also applied to a reset terminal 72R of the counter 72. The square wave generator 71 is connected to the counter 72. The counter 72 divides the frequency of the square wave generator 71 and generates an output signal which is cyclically reversed or changed for every period of time $\Delta t$ when the comparator 65 generates an "L" level signal. The output signal from the counter 72 is applied to the oscillator 51 through the OR gate 73. The oscillator 51 vibrates the stator 3 as long as the OR gate 73 generates an "H" level signal.

Figure 5:
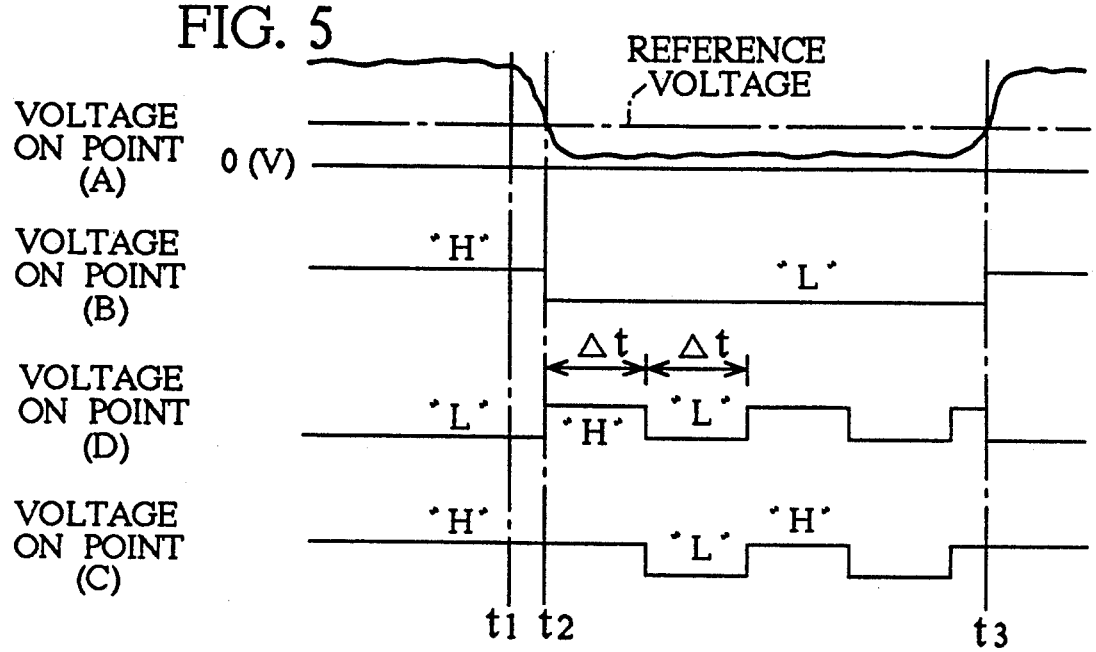
FIG. 5 is a wave form chart showing various wave forms taken at selected points in FIG. 4.

Referring now to FIG. 5, operation of the second embodiment is explained.

At the time $t_1$, an excessive load is applied to the rotor 6 and rotational speed of the rotor 6 is decreased.

At the time $t_2$, when the voltage at point A is less than the reference voltage, voltage at point B is reversed or changed from the "H" level to the "L" level. Thus, stoppage of the rotor 6 is detected. At this time, the reset terminal 72R is changed from the "H" level to the "L" level and the counter 72 starts the operation. At this time, slippage is generated between the rotor 6 and the stator 3. As a result of the slippage, deterioration of the rotor 6, the stator 3 and the friction film 7 increases.

After elapse of a predetermined period of time Δt from detecting stoppage of the rotor 6, voltage at a point D is reversed or changed from the "H" level to the "L" level. Then, the voltage at the point C is also inverted from the "H" level to the "L" level, and the oscillator 51 stops oscillating.

Thus, when the rotational speed of the rotor 6 is less than the predetermined speed, the control circuit 70 stops the oscillation of the oscillation circuit 50. When the oscillation circuit 50 stops oscillating, slippage is no longer generated between the rotor 6 and the stator 3. Therefore, the deterioration of the rotor 6, the stator 3 and the friction film 7 are successfully decreased.

In the second embodiment, the counter 72 generates the output signal which is cyclically reversed or changed for every period of time Δt. Therefore, after elapse of the predetermined period of time Δt, the oscillation circuit 50 restarts the oscillation and the rotor 6 is capable of restarting the rotation.

At the time $t_3$, when the rotor 6 restarts the rotation, the output of the comparator 65 is reversed or changed from the "L" level to the "H" level. As a result, the counter 72 is initialized.

As in the first embodiment, in the second embodiment the oscillation circuit 5 oscillates continuously for the period of time Δt, after detecting the stoppage of the rotor 6. Therefore, the vibratory motor 100 of the first embodiment avoids sudden stoppage of the rotor 6 due to imposition of an excessive load.

Furthermore, in the second embodiment, the oscillation circuit 50 restarts oscillating cyclically for every period of time Δt. Therefore, the rotor 6 restarts the rotation after removal or otherwise overcoming the excessive load.

Figure 6:
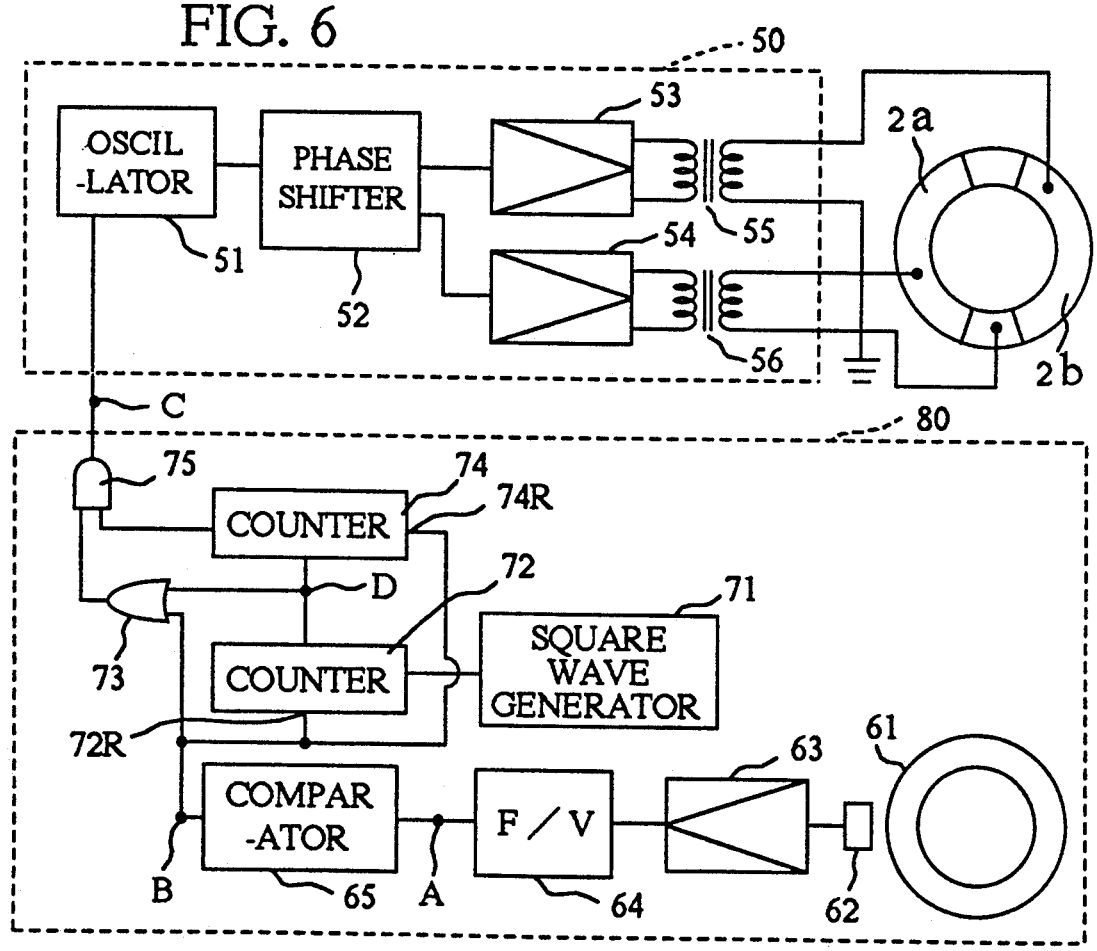
FIG. 6 is a block diagram of the oscillator circuit and control circuit in accordance with a third embodiment of this invention.

Next, referring now to FIG. 6, the third embodiment of the invention is explained. The third embodiment has the same construction as the second embodiment except for the control circuit 80. Therefore, only the control circuit 80 is explained herein below.

The control circuit 80 includes a counter 74 and an AND gate 75 in addition to the circuitry of the second embodiment. The output signal from the comparator 65 is applied to the oscillator 51 through the OR gate 73 and the AND gate 75. Further, the output signal from the comparator 65 is also applied to the reset terminal 72R of the counter 72 and the reset terminal 74R of the counter 74. The counter 72 divides the frequency of the signal from the square wave generator 71 and generates an output signal which is cyclically reversed or changed for every period of time Δt, when the comparator 65 generates an "L" level signal. Further, the counter 74 counts the number of reversing or changing signals from the counter 72. The counter 74 closes the AND gate 75 when the signal from the counter 72 is reversed a predetermined number, e.g., three times.

The output signal from the counter 72 is applied to the oscillator 51 through the OR gate 73 and the AND gate 75. The oscillator 51 vibrates the stator 3 as long as the output signal from the AND gate 75 is at the "H" level.

Figure 7:
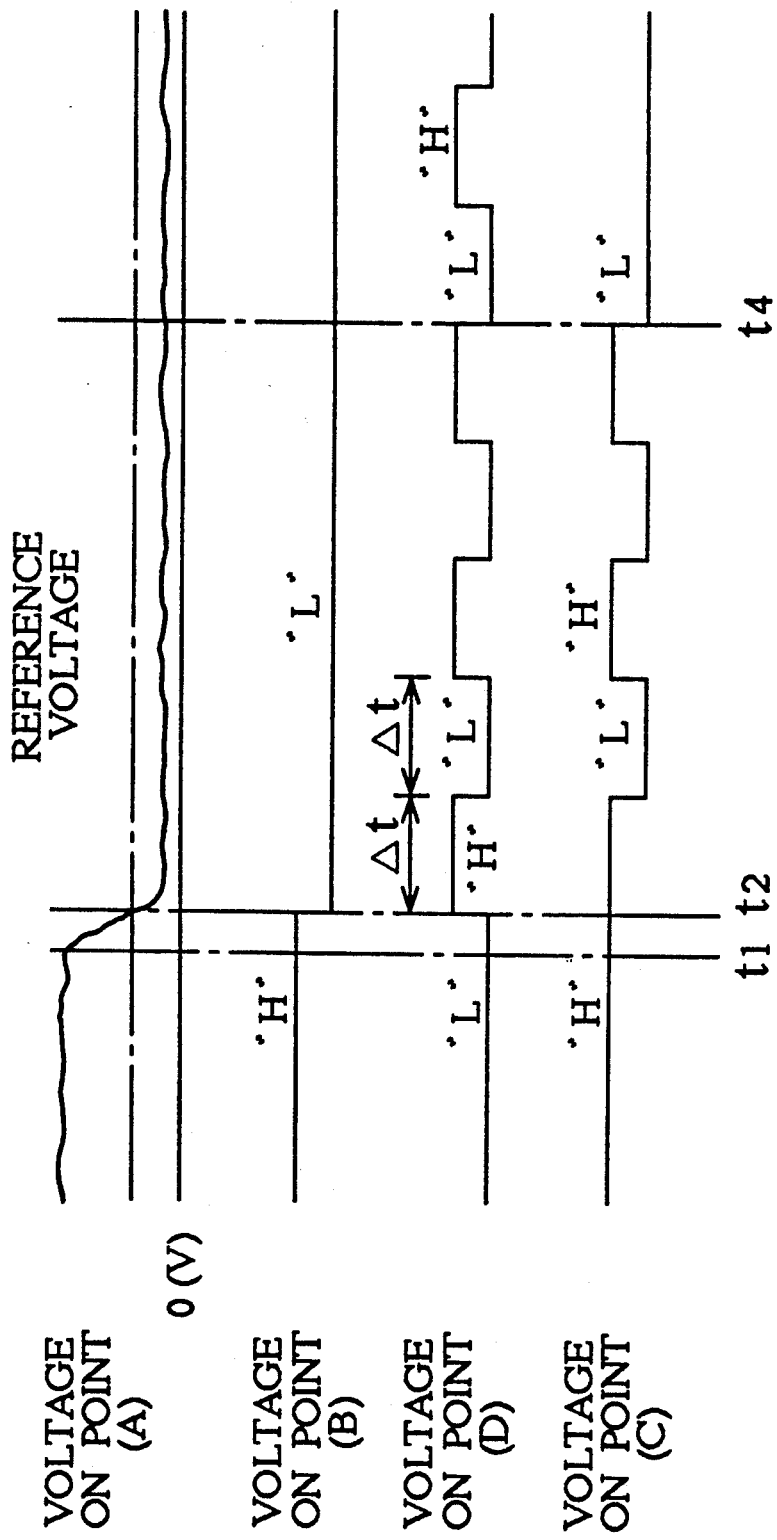
FIG. 7 is a wave form chart showing various wave forms taken at selected points in FIG. 6.

Referring now to FIG. 7, operation of the third embodiment is explained.

At the time $t_1$, the excessive load is connected to the rotor 6 and the rotational speed of the rotor 6 is decreased.

At the time $t_2$, when voltage at point A is less than the reference voltage, voltage at point B is reversed or changed from the "H" level to the "L" level. Thus, stoppage of the rotor 6 is detected. At this time, the reset terminals 72R and 74R are reversed from the "H" level to the "L" level and the counters 72 and 74 start the operation.

After elapse of a predetermined period of time Δt from detecting stoppage of the rotor 6, voltages at the points C and D are reversed or changed from the "H" level to the "L" level. After voltage at the point D is reversed, e.g., three times, the counter 74 closes the AND gate 75. Then, the voltage at point C is sustained at the "L" level. As a result of this, oscillation circuit 50 stops oscillating continuously.

Thus, when the rotational speed of the rotor 6 is less than the predetermined speed, the control circuit 80 stops the oscillation of the oscillator 50. When the oscillation circuit 50 stops oscillating, a large amount slippage is no longer generated between the rotor 6 and the stator 3. Therefore, deterioration of the rotor 6, the stator 3 and the friction film 67 are successfully decreased.

In the third embodiment, the counter 74 closes the AND gate 75 in order to prevent the rotor 6 from restarting if the rotor 6 does not start rotating after three attempts of restarting. Therefore, in the third embodiment, when the rotor 6 temporarily stops the rotation, the rotor 6 could be restarted. Further, when the rotor 6 stops the rotation for a long time, power which would be used in attempts at restarting the rotor 6 is effectively conserved.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A vibratory motor for generating a traveling wave comprising:
   a stator member;
   a vibrating member fixed to the stator member and generating the traveling wave;
   a rotor member in contact with the stator member and driven by the traveling wave on the stator member;
   oscillating means for generating the traveling wave on the stator member;
   detecting means for detecting a rotational speed of the rotor member;
   control means including a comparator for stopping oscillation of the oscillating means when the rotational speed of the rotor is less than a predetermined speed;
   delaying means for oscillating the oscillating means for a predetermined time when the rotational speed is less than the predetermined speed; and
   restart means for restarting the oscillating means after a predetermined period of time.

2. A motor as claimed in claim 1 wherein the restart means further comprises:

counter means for limiting restarting of the oscillating means to a predetermined number of times.

3. A motor as claimed in claim 1, including first counter means for generating an output signal which is cyclically reversed when the rotational speed is less than the predetermined speed.

4. A motor as claimed in claim 3, including second counter means for generating an output signal indicative of a predetermined number of cyclical reversals generated by said first counter means.

5. A motor as claimed in claim 1, further including first counter means for generating an output signal which is cyclically reversed when the rotational speed is less than the predetermined speed; and second counter means for generating an output signal indicative of a predetermined number of cyclical reversals generated by said first counter means.

* * * * *